United States Patent [19]
Aitken et al.

[11] Patent Number: 5,529,961
[45] Date of Patent: Jun. 25, 1996

[54] CUPROUS PYROPHOSPHATE GLASSES

[75] Inventors: Bruce G. Aitken, Erwin; George H. Beall, Big Flats; James E. Dickinson, Jr., Corning, all of N.Y.

[73] Assignee: Corning Incorporated, Corning, N.Y.

[21] Appl. No.: 367,465

[22] Filed: Dec. 30, 1994

[51] Int. Cl.[6] .............. C03C 3/16; C03C 3/21; C03C 3/19; C03C 3/17
[52] U.S. Cl. .............. 501/45; 501/46; 501/47; 501/48; 65/32.1; 65/134.1
[58] Field of Search ................ 501/45, 46, 47, 501/48, 44; 65/32.1, 134.1, 134.3

[56] References Cited

U.S. PATENT DOCUMENTS

| | | | |
|---|---|---|---|
| 4,217,382 | 8/1980 | Toratani | 501/47 |
| 4,407,786 | 10/1983 | Drake et al. | 501/45 |
| 4,482,541 | 11/1984 | Telfer et al. | 424/128 |
| 4,874,724 | 10/1989 | Beall et al. | 501/46 |
| 4,940,677 | 7/1990 | Beall et al. | 501/45 |
| 4,996,172 | 2/1991 | Beall et al. | 501/45 |
| 5,021,366 | 6/1991 | Aitken | 501/45 |
| 5,043,369 | 8/1991 | Bahn et al. | 523/466 |
| 5,071,795 | 12/1991 | Beall et al. | 501/44 |
| 5,122,484 | 6/1992 | Beall et al. | 501/46 |
| 5,286,683 | 2/1994 | Aitken | 501/45 |
| 5,330,940 | 7/1994 | Aitken et al. | 501/46 |

*Primary Examiner*—Mark L. Bell
*Assistant Examiner*—Louis M. Troilo
*Attorney, Agent, or Firm*—Milton M. Peterson

[57] ABSTRACT

The subject invention is directed at glasses wherein either a portion of the ZnO or alkali metals, or both, is replaced by $Cu_2O$, i.e., monovalent copper. Specifically, the present invention is directed at a glass consisting essentially of, expressed in terms of mole percent on the oxide basis, 28–42% $P_2O_5$, 15–30% $Cu_2O$, 10–30% $R_2O$, wherein $R_2O$ is selected from the group consisting of 0–15% $Li_2O$, 0–20% $Na_2O$, and 0–10% $K_2O$, and up to a total of 45% of optional ingredients in the indicated proportions selected from the group consisting of 0–10% $Al_2O_3$, 0–15% MgO, 0–20% CaO, 0–20% SrO, 0–20% BaO, 0–25% MgO+CaO+SrO+BaO, 0–35% ZnO, 0–10% MnO, 0–2% $CeO_2$, 0–2% $Ln_2O_3$, 0–10 $Al_2O_3$ 0–10% $B_2O_3$, 0–10 $Fe_2O_3$ 0–10% $Al_2O_3$+$B_2O_3$+$Fe_2O_3$, 0–7% $MoO_3$ 0–7% $WO_3$ 0–7% $MoO_3$+$WO_3$, and 0–8% F, the latter as analyzed in weight percent. In addition, it is necessary that the predominate proportion of the copper in the glass is present in the cuprous or $Cu^+$ oxidation state. These inventive glasses exhibit a transition temperature normally below about 300° C., a working temperature below about 400° C., while, at the same time, exhibiting excellent resistance to attack by water.

5 Claims, No Drawings

CUPROUS PYROPHOSPHATE GLASSES

RELATED APPLICATION

U.S. patent application Ser. No. 08/367,466, filed concurrently herewith by B. G. Aitken et al. under the title "Cuprous Metaphosphate Glasses", and assigned to the same assignee as the present application.

FIELD OF THE INVENTION

The present invention relates to a cuprous pyrophosphate glass exhibiting an extremely low softening point of about less than 300° C. and exhibiting excellent resistance to moisture attack.

BACKGROUND OF THE INVENTION

Considerable research has been conducted in the past to devise inorganic glasses exhibiting low transition temperatures ($T_g$), thereby enabling melting and forming operations to be carried out at low temperatures. As conventionally defined, the transition temperature of a glass is that temperature at which a notable increase in the thermal expansion coefficient is recorded, accompanied by a change in specific heat ($C_p$). More recently, it has been recognized that glasses demonstrating low transition temperatures are potentially useful materials for a host of applications, including applications as sealing materials and as a component in glass-organic polymer alloys and composites. Alloys, a very recent development disclosed in U.S. Pat. No. 5,043,369 (Bahn et al.), are prepared from a glass and a thermoplastic or thermosetting polymer having compatible working temperatures; i.e., the glass and the polymer are combined at the working temperature to form an intimate mixture. Articles produced from these alloy materials exhibit chemical and physical properties comprising a complementary blend of those demonstrated by the particular glass and polymer. For example, the alloys frequently display a combination of high surface hardness, high stiffness, and high toughness. Glasses having base compositions within the general zinc-phosphate system have been found to be especially suitable for the glass component of glass-polymer alloys. Two illustrations of recent research in this zinc-phosphate system are reported below.

U.S. Pat. No. 4,940,677 (Beall et al.) discloses glasses exhibiting transition temperatures below 450° C., preferably below 350° C., consisting essentially, in mole percent, of at least 65% total of 23–55% ZnO, 28–40% $P_2O_5$, and 10–35% $R_2O$, wherein $R_2O$ consists of at least two alkali metal oxides in the indicated proportions selected from the group of 0–25% $Li_2O$, 0–25% $Na_2O$, and 0–25% $K_2O$, and up to 35% total of optional constituents. The optionals are selected from the group of 0–6% $Al_2O_3$, 0–8% $B_2O_3$, 0–8% $Al_2O_3$+$B_2O_3$, 0–15% $CU_2O$, 0–5% F, 0–35% PbO, 0–35% SnO, 0–35% PbO+SnO, 0–5% $ZrO_2$, 0–4% $SiO_2$, and 0–15% MgO+CaO+SrO+BaO+MnO, consisting of 0–10% MgO, 0–10% CaO, 0–10% SrO, 0–12% BaO, and 0–10% MnO.

U.S. Pat. No. 5,286,683 (Aitken) discloses a preferred composition consisting essentially of 30–35% $P_2O_5$, 5–15% $Na_2O$, 5–10% $Li_2O$, 0–7% $K_2O$, 13–25% $Li_2O$+$Na_2O$+$K_2O$, 15–45% CuO, 0–15% CaO, 0–15% SrO, 0–15% BaO, 0–15% CaO+SrO+BaO, 0–3% $Al_2O_3$, 0–3% $B_2O_3$ 0–3% $Al_2O_3$,+$B_2$, 0–30% Zn and 0–27% $Sb_2O_3$. Furthermore, there is disclosed therein the requirement that a predominate portion of the copper present in the glass be in the $Cu^{+2}$, or cupric oxidation state and that at least two alkali metal oxides be present.

The above-described zinc-phosphate glasses demonstrate relatively excellent resistance to chemical attack when compared to previous phosphate-based glasses. Nevertheless, the search has been continuous to discover new and different glass compositions displaying low transition temperatures with equivalent or even greater chemical durability. Resultant advantages of these lowered transition temperature, yet durable glasses, would include: (1) lowered energy costs attributed the glass formation and the subsequent preparation of glass/polymer alloys and composites; (2) an increase in the number of compatible polymers available for co-processing with the glass to form glass/polymer composites and for thermally co-deforming with the glass to form glass/polymer alloys; (3) a likely increase in the number of potential commercial applications of the alloys and composites; and, (4) uses of the glass as sealing materials.

Previously, an inherent drawback of lowering the transition temperature was the corresponding decrease in the durability, i.e., reduced resistance to attack by water. Accordingly, the principal objective of the present invention was to devise glass compositions having a transition temperature normally below about 300°, a working temperature below about 400°, while, at the same time, exhibiting excellent resistance to attack by water, i.e., at least comparable to glass compositions with much higher transition temperatures.

SUMMARY OF THE INVENTION

Although the prior art discloses beneficial effects of the addition of a copper-containing constituent to zinc-phosphate glasses, the subject invention is founded on the discovery of glasses wherein either a portion of the ZnO or alkali metals, or both, is replaced by $Cu_2O$, i.e., cuprous or monovalent copper. More specifically, the present invention discloses a glass consisting essentially of, expressed in terms of mole percent on the oxide basis, 28–42% $P_2O_5$, 15–30% $Cu_2O$, 10–30% $R_2O$, wherein $R_2O$ is selected from the group consisting of 0–15% $Li_2O$, 0–20% $Na_2O$, and 0–10% $K_2O$. A 45% total of optional ingredients may be included in the inventive composition, in the indicated proportions: 0–10% $Al_2O_3$, 0–15% MgO, 0–20% CaO, 0–20% SrO, 0–20% BaO, 0–25% MgO+CaO+SrO+BaO, 0–35% ZnO, 0–10% MnO, 0–2% $CeO_2$, 0–2% $Ln_2O_3$, 0–10% $B_2$, 0–10% $Al_2O_3$, 0–10% $Fe_2O_3$, 0–10% $Al_2O_3$+$B_2O_3$+$Fe_2O_3$, 0–7% $MoO_3$, 0–7% $WO_3$ 0–7% $MoO_3$+$WO_3$, and 0–8% F, the latter as analyzed in weight percent. In addition, it is necessary that the predominate proportion of the copper in the glass is present in the $Cu^+$ oxidation state. These inventive glasses exhibit a transition temperature normally below about 300°, a working temperature below about 400°, while, at the same time, exhibiting excellent resistance to attack by water.

The inventive addition of the $Cu_2O$ component to the above prior art compositions as the ZnO replacement, results in a glass with comparable durability coupled with a corresponding decrease in the transition temperature when compared to the analogous $Cu_2O$-free glass. On the other hand, the $Cu_2O$ addition as an alkali metal replacement results in glasses with a comparable transition temperature but possessing increased durability, again when compared to those same glasses when $Cu_2O$-free. Furthermore, the combined replacement of $Cu_2O$ for a portion of the ZnO and a portion of the alkali metal oxide would result in a glass possessing a mixture of the above two conditions. In any case, it is imperative to note that the resultant glasses which may be produced within the inventive composition and containing the requisite predominate $Cu^+$ component, would possess a durability that could not have been previously obtained in glasses with transition temperatures as low as those possessed by the inventive glasses disclosed herein.

DESCRIPTION OF THE PREFERRED EMBODIMENTS

The desired and inventive glass formulation, consists essentially of the following (in mole percent): 28–42% $P_2O_5$, 15–30% $Cu_2O$, 10–30% $R_2O$, wherein $R_2O$ is selected from the group consisting of 0–15% $Li_2O$, 0–20% $Na_2O$, and 0–10% $K_2O$. A 45% total of optional ingredients in the indicated proportions may be included in the inventive composition: 0–15% MgO, 0–20% CaO, 0–20% SrO, 0–20% BaO, 0–25% MgO+CaO+SrO+BaO, 0–35% ZnO, 0–10% MnO, 0–2% $CeO_2$, 0–10% $Al_2O_3$, 0–10% $Fe_2O$, 0–10% $B_2O_3$, 0–10% $Al_2+Fe_2O_3,+B_2O_3$, 0–2% $Ln_2O_3$, 0–7% $MoO_3$, 0–7% $WO_3$, 0–7% $MoO_3+WO_3$, and 0–8% F, the latter as analyzed weight percent.

It is imperative to note that it is necessary to ensure that the resultant glass exhibits a predominate proportion of copper existing in the $Cu^+$, or monovalent, oxidation state. It should be noted that all the inventive glasses disclosed herein, despite being formulated as consisting of 100% $Cu_2O$, contain both $Cu^+$ and $Cu^{++}$. We therefore define cuprous glasses, the subject of the instant invention, as being those glasses wherein the ratio of cuprous copper to total copper ($Cu^+/Cu$ ratio) is 50% or greater.

Generally, the method for a making the glass disclosed herein involves the following steps: firstly, heating a glass batch formulated to produce a glass within the desired and above-described glass composition region to a temperature sufficient to cause the glass batch to form a homogeneous melt, while maintaining melting conditions which will ensure that the predominate proportion of the copper in the glass exhibits a $Cu^+$ oxidation state. Once attaining a homogeneous melt, the inventive method involves thereafter cooling the melt and simultaneously shaping a glass article of a desired shape therefrom.

In order ensure that the glasses consist of a 50% or greater $Cu^+/Cu$, the glasses should be prepared under reducing conditions. The latter can be accomplished in a number of ways, including: (1) the use of a cuprous copper compound as the batch source of copper, e.g. $Cu_2O$ or $Cu_2CO_3$, (2) the use of additional reducing agents as the batch source of $P_2O_5$, notably $NH_4H_2PO_4$ and $(NH_4)_2HPO_4$, and, (3) the use of strong reducing agents as the source of certain optional components. As an example, it is preferable to include 1–2% $Al_2O_3$ in the glass formulation in order to further improve the chemical durability of the glass and, by batching the $Al_2O_3$ wholly or partially in the form of Al metal, strong reducing conditions are attained that favor the formation of $Cu^+$ at the expense, of $Cu^{++}$ and, hence, yield glasses with high $Cu^+/Cu$ ratios. In addition, glasses characterized by similarly high $Cu^+/Cu$ ratios can be produced by melting the glass batch at higher temperatures and/or for shorter periods of time.

Table I records a number of glass compositions, expressed in terms of mole percent on the oxide basis, illustrating the parameters of the present inventive glasses. In the case of those glasses which contain fluoride as a constituent, it is merely reported in terms of the metal fluoride by which it was included in the glass batch; it is not known with which cation(s) the fluoride is combined in the glass. Table IA reports the same compositions, but wherein the values of the individual components have been converted to weight percent. It should be noted that the weight percent of the copper oxide in the Table IA examples is expressed as CuO in order to facilitate comparison with other copper-containing glasses. To obtain weight percent compositions with copper as $Cu_2O$, the CuO content should be multiplied by 0.8994 and then renormalized to the 100% total.

The actual batch ingredients for the glasses comprised any materials, either the oxides or other compounds, which, upon being melted together, were converted into the desired oxides in the proper proportions. For example, $Li_2CO_3$ may constitute the source of $Li_2O$, while $ZnF_2$ may provide the source of ZnO and F. However, it should be noted that, in order to maintain the reducing conditions during the melting of the glass necessary to ensure that the copper is predominately retained in the $Cu^+$ oxidation state, the following specific batch ingredients were used: (1) the copper batch source was completely $Cu_2O$; (2) one quarter of the $Al_2O_3$ required in each composition was batched as Al metal; and, (3) the bulk of the phosphate required in each composition was batched as ammonium phosphate ($NH_4H_2PO_4$). The only exception to the batch ingredients above is that Example 1 was batched in the following manner: (1) the bulk of the required copper was batched in the form of $Cu_2O$, while one half of one mole percent was batched as Cu metal; phosphate source was the same.

The batch materials were compounded, automatically tumble-mixed in order to achieve a homogeneous melt, and thereafter placed into silica crucibles. The crucibles were then covered, placed into a furnace operating at a temperature of about 1000° C. for approximately three hours. Very little volatilization of $P_2O_5$, or any other species was noted during the melt. The melts were then poured into a steel mold to form rectangular glass slabs exhibiting dimensions of approximately 6"×4"×0.5" (15.24 cm×10.16cm×1.27 cm) which were subsequently placed into an annealer operating at approximately 275°–325° C. and immediately thereafter allowed to cool to room temperature at the furnace rate.

TABLE I

|  | 1 | 2 | 3 | 4 | 5 | 6 | 7 | 8 | 9 |
|---|---|---|---|---|---|---|---|---|---|
| $P_2O_5$ | 38.4 | 38.4 | 40.7 | 38.4 | 38.4 | 38.4 | 39.5 | 39.5 | 40.7 |
| $Cu_2O$ | 16.3 | 16.3 | 23.5 | 16.3 | 16.3 | 16.3 | 19.8 | 19.8 | 23.5 |
| ZnO | 19.8 | 27.9 | 17.3 | 19.7 | 23.8 | 15.7 | 22.8 | 18.6 | 13.0 |
| $Li_2O$ | 8.14 | 5.29 | 5.62 | — | 6.72 | 9.56 | 5.45 | 6.92 | 7.13 |
| $Na_2O$ | 9.36 | 6.05 | 6.42 | — | 7.67 | 10.9 | 6.23 | 7.9 | 8.15 |
| $K_2O$ | 5.81 | 3.78 | 4.01 | 5.81 | 4.8 | 6.83 | 3.89 | 4.94 | 5.09 |
| $Al_2O_3$ | 2.33 | 2.33 | 2.47 | 2.33 | 2.33 | 2.33 | 2.40 | 2.40 | 2.47 |
| $Li_2F_2$ | — | — | — | 2.33 | — | — | — | — | — |
| $Na_2F_2$ | — | — | — | 9.3 | — | — | — | — | — |
| $ZnF_2$ | — | — | — | — | — | — | — | — | — |

TABLE I-continued

| $T_g$ | 235 | 283 | 277 | 242 | 273 | 267 | 289 | 276 | 258 |
|---|---|---|---|---|---|---|---|---|---|
| wt. loss (%) | 0.03 | 0.02 | 0.03 | 0.12 | 0.03 | 0.02 | 0.02 | 0.01 | .07 |
| $Cu^+/Cu_2O$ | 93.4 | — | 63.4 | 82.4 | 62.9 | 60.6 | — | 60.5 | 62.9 |

|  | 10 | 11 | 12 | 13 | 14 | 15 | 16 | 17 | 18 |
|---|---|---|---|---|---|---|---|---|---|
| $P_2O_5$ | 39.5 | 40.7 | 39.5 | 38.4 | 38.0 | 38.0 | 38.0 | 38.0 | 38.0 |
| $Cu_2O$ | 19.8 | 23.5 | 19.8 | 16.3 | 20.0 | 22.0 | 24.0 | 20.0 | 20.0 |
| ZnO | 14.4 | 8.64 | 10.2 | 4.07 | 20.0 | 18.0 | 16.0 | 20.0 | 17.0 |
| $Li_2O$ | 8.38 | 8.64 | 9.85 | 9.56 | 7.0 | 7.0 | 7.0 | 10.0 | 11.0 |
| $Na_2O$ | 9.58 | 9.88 | 11.3 | 10.9 | 8.0 | 8.0 | 8.0 | 10.0 | 12.0 |
| $K_2O$ | 5.99 | 6.17 | 7.04 | 6.83 | 5.0 | 5.0 | 5.0 | — | — |
| $Al_2O_3$ | 2.40 | 2.47 | 2.40 | 2.33 | 2.0 | 2.0 | 2.0 | 2.0 | 2.0 |
| $Li_2F_2$ | — | — | — | — | | | | | |
| $Na_2F_2$ | — | — | — | — | | | | | |
| $ZnF_2$ | — | — | — | 11.6 | | | | | |
| $T_g$ | 277 | 249 | 253 | 232 | | | | | |
| wt. loss (%) | 0.01 | 0.13 | 0.06 | 0.11 | | | | | |
| $Cu^+/Cu_2O$ | — | 67.5 | 64.7 | 85.9 | | | | | |
| Tg | | | | | 261 | 263 | 253 | 285 | 269 |
| wt loss | | | | | <0.01 | 0002 | 0.02 | <0.01 | <0.01 |

TABLE IA

|  | 1 | 2 | 3 | 4 | 5 | 6 | 7 | 8 | 9 |
|---|---|---|---|---|---|---|---|---|---|
| $P_2O_5$ | 48.4 | 47.6 | 47.6 | 47.3 | 48.0 | 48.8 | 47.6 | 48.0 | 48.0 |
| CuO | 23.0 | 22.6 | 30.7 | 22.5 | 22.8 | 23.2 | 26.7 | 26.9 | 31.0 |
| ZnO | 14.3 | 19.8 | 11.6 | 14.0 | 17.1 | 11.4 | 15.7 | 12.9 | 8.76 |
| $Li_2O$ | 2.16 | 1.38 | 1.38 | 2.11 | 1.77 | 2.56 | 1.38 | 1.77 | 1.77 |
| $K_2O$ | 3.94 | 3.11 | 3.11 | 4.75 | 3.97 | 5.76 | 3.11 | 3.98 | 3.98 |
| $Na_2O$ | 5.12 | 3.27 | 3.28 | 5.00 | 4.19 | 6.06 | 3.28 | 4.19 | 4.19 |
| $Al_2O_3$ | 2.11 | 2.07 | 2.07 | 2.06 | 2.09 | 2.12 | 2.07 | 2.09 | 2.09 |
| F | — | — | — | 3.83 | — | — | — | — | — |

|  | 10 | 11 | 12 | 13 | 14 | 15 | 16 | 17 | 18 |
|---|---|---|---|---|---|---|---|---|---|
| $P_2O_5$ | 48.4 | 48.4 | 48.8 | 47.7 | 46.5 | 45.9 | 45.3 | 47.5 | 47.9 |
| CuO | 27.1 | 31.2 | 27.3 | 22.7 | 27.4 | 29.8 | 32.0 | 28.0 | 28.3 |
| ZnO | 10.1 | 5.89 | 7.20 | 11.2 | 14.0 | 12.5 | 10.9 | 14.3 | 12.3 |
| $Li_2O$ | 2.16 | 2.16 | 2.56 | 2.50 | 1.80 | 1.78 | 1.76 | 2.63 | 2.92 |
| $K_2O$ | 4.87 | 4.87 | 5.76 | 5.63 | 4.06 | 4.01 | 3.95 | — | — |
| $Na_2O$ | 5.12 | 5.13 | 6.07 | 5.93 | 4.27 | 4.22 | 4.16 | 5.46 | 6.61 |
| $Al_2O_3$ | 2.11 | 2.11 | 2.12 | 2.07 | 1.76 | 1.73 | 1.71 | 1.80 | 1.81 |
| F | — | — | — | 3.87 | — | — | — | — | — |

In addition to reporting the relative amounts of the batch constituents, Table I reports the transition temperature ($T_g$) in terms of °C., as measured by employing standard differential scanning calorimetry techniques and the chemical durability in $H_2O$ expressed in terms of percentage weight loss (wt. loss). In order to measure the weight loss, i.e., the moisture resistance/durability, samples measuring approximately 2"×1"×0.5" (5.08 cm×2.54 cm×1.27 cm) were cut from the glass slab for testing. The test involved weighing each sample carefully and then immersing the sample into a bath of boiling deionized water. After a residence time of six hours, the sample was removed from the bath, allowed to dry in the ambient environment, and thereafter reweighed to determine any loss of weight by the sample. This loss of weight for each glass sample as reported in Table I is then calculated as a percentage of the original untested/unimmersed weight. It is necessary to note that a weight loss percentage greater than 0.15% is considered to represent unsatisfactory chemical durability, with losses less than or equal to 0.02% being greatly preferred. Lastly, Table I records the percentage of the copper in the monovalent or $Cu^+$ form expressed as a percentage of the total copper; determined through magnetic susceptibility measurements.

Table I illustrates that these inventive glasses possess exceptionally low transition temperatures, in some cases below 250° C., corresponding to working temperatures below about 300° C. and that they exhibit measures of durability/resistance to moisture ranging from 0 to 0.15 percent weight loss. The values are exceptionally low for glasses within this range of transition/working temperature; they are comparable to those measures of durability exhibited by glasses possessing transition/working temperatures as much as 50° to 100° C. greater, e.g., those phosphate glasses disclosed in U.S. Pat. Nos. 4,940,677 (Beall et al.), 4,920,081 (Beall et al.) or 5,286,683 (Aitken).

As can be observed from Table I, the copper contained in the inventive glasses is present predominately in the $Cu^+$ oxidation state, i.e., the copper present in the inventive glasses is predominately in the monovalent or cuprous form, and it far outweighs the influence of copper in the divalent, $Cu^{+2}$ form. These oxidation percentage values, coupled with the durability data, fully support the fact that the inventive glasses disclosed herein are unique in that they possesses a $T_g$ which is considerably lower than those customarily exhibited by the prior an glasses, while at the same time possessing a durability which is essentially equivalent, due to the presence of copper in the monovalent form, i.e., $Cu^+$ oxidation state.

While not intending to be limited by theory, it is believed that the beneficial effect of cuprous or monovalent copper is due to the fact that the component $Cu_2O$ behaves both as an alkali oxide and as a transition metal oxide. The alkali oxide-like behavior of $Cu_2O$ manifests itself in the low $T_g$ of cuprous glasses and is due to the lower field strength (charge divided by ionic radius) of the $Cu^+$ ion (1.02) relative to that of $Cu^{++}$ (2.78); in fact, the field strength of $Cu^+$ is essentially the same as that of $Na^+$ (1.01). The transition metal oxide-like behavior is presumed to be related to a lower isoelectric point of $Cu_2O$ relative to an alkali oxide, and results in the improved resistance to water/humidity of cuprous glasses.

COMPARISON EXAMPLES

Table II reports several compositions, expressed in terms of mole percent, taken directly from U.S. Pat. No. 5,286,683 (Aitken) which are similar to those of the instant application in being alkali copper zinc phosphates, but which, however, are outside the scope of the inventive glasses disclosed herein as they do not possess a predominate portion of the copper in the requisite form, i.e., the monovalent $Cu^+$ form.

As a result of the presence of copper in the divalent form (all the compositions possess at least 70% divalent copper), the transition temperatures of these compositions are considerably higher than that of the inventive composition.

TABLE II

|  | 19 | 20 | 21 | 22 | 23 |
|---|---|---|---|---|---|
| $Li_2O$ | 7.0 | 7.0 | 7.0 | 7.0 | 7.0 |
| $Na_2O$ | 8.0 | 8.0 | 8.0 | 8.0 | 8.0 |
| $K_2O$ | 5.0 | 5.0 | 5.0 | 5.0 | 5.0 |
| CuO | 30.0 | 30.0 | 30.0 | 45.0 | 30.0 |
| ZnO | 15.0 | 7.5 | — | — | — |
| $Sb_2O_3$ | — | 7.5 | 15.0 | — | — |
| CaO | — | — | — | — | 11.2 |
| BaO | — | — | — | — | — |
| $ZnF_2$ | — | — | — | — | — |
| $Al_2O_3$ | 2.0 | 2.0 | 2.0 | 2.0 | 2.0 |
| $B_2O_3$ | — | — | — | — | — |
| $P_2O_5$ | 33.0 | 33.0 | 33.0 | 33.0 | 33.0 |
| $Cu^{+2}$ | 74 | 76 | 77 | 76 | 72 |
| $T_g$ | 339 | 367 | 340 | 360 | 362 |

Table III reports the composition of three typical phosphate glasses, exhibiting transition temperatures comparable to those exhibited by the inventive glasses. It is clear from the durability data reported therein (wt. loss), ranging from a 5% weight loss to a complete dissolving of the glass, that the inventive glasses exhibit a much greater durability than these representative phosphate samples possessing comparable transition temperatures; note that these comparison samples were only immersed in boiling water for one hour.

TABLE III

|  | 24 | 25 | 26 |
|---|---|---|---|
| $P_2O_5$ | 46 | 46 | 46 |
| $Al_2O_3$ | 4 | 4 | 4 |
| $Li_2O$ | 25 | — | 25 |
| $Na_2O$ | 25 | 25 | — |
| $K_2O$ | — | 25 | 25 |
| wt/loss (%) | 5.0 | dissolved completely | 25.0 |
| $T_g$ | 290 | 260 | 280 |

Table IV reports the composition of one example, 1, within the scope of the inventive composition range and three examples, 27, 28 and 29, outside the scope. A comparison of these examples supports the inventive concept which underlies the basis for forming the inventive compositions disclosed herein—the $Cu^+$ for alkali and/or Zn substitution. In other words, the examples in Table IV demonstrate the contention that a glass containing predominately $Cu^+$, as opposed to the same basic glass containing either zinc or alkali in its place, has the best combination of a low $T_g$ and good durability.

Specifically, a comparison of Examples 1 and 27 verifies that an alkali Zn-pyrophosphate glass which has the ZnO constituent replaced by $Cu_2O$ exhibits a lower $T_g$ while still exhibiting comparable durability. A comparison of Examples 1 and 29 verifies that replacing a portion of the alkali oxide with an amount of $Cu_2O$ results in a glass which exhibits both a decrease in $T_g$ and an increase in the durability; note that the relative proportions of Li/Na/K are kept constant. Lastly, a comparison of Examples 1 and 28 verifies that replacing ZnO and $R_2O$ by equal amounts of $Cu_2O$ results in a glass which, again exhibits both a decrease in $T_g$ and a increase in the durability.

TABLE IV

|  | 1 | 27 | 28 | 29 |
|---|---|---|---|---|
| $P_2O_5$ | 38.4 | 38.4 | 38.4 | 38.4 |
| CuO | 16.3 | — | — | — |
| ZnO | 19.8 | 36.1 | 27.9 | 19.8 |
| $Li_2O$ | 8.14 | 8.1 | 11.0 | 13.8 |
| $Na_2O$ | 9.36 | 9.3 | 12.6 | 15.8 |
| $K_2O$ | 5.81 | 5.8 | 7.8 | 9.9 |
| $Al_2O_3$ | 2.33 | 2.3 | 2.3 | 2.3 |
| $(R_2O)$ | (23.3) | (23.2) | (31.4) | (39.5) |
| $T_g$ | 235 | 319 | 298 | 281 |
| Wt. loss | 0.03 | 0.03 | 0.16 | 0.44 |

It is necessary to note that the above description reflects laboratory melting and forming practice only. It will be appreciated that the recited compositions are capable of being melted in large scale melting units and shaped into desired configurations utilizing forming techniques conventional in the glassmaking art. As is the case with standard glassmaking practice, it is only necessary to ensure that the batch materials are mixed together thoroughly and then melted at temperatures which will ensure a homogenous melt without excessive volatilization of any oxides or fluoride present, and that the melt is thereafter cooled, shaped into a glass body of a desired geometry and subsequently annealed.

We claim:

1. A glass exhibiting a transition temperature below about 300° C., a working temperature, below about 400° C. and exhibiting excellent resistance to attack by water, the glass consisting essentially, expressed in terms of mole percent on the oxide basis, of 28–42% $P_2O_5$, 15–30% $Cu_2O$, 10–30% $R_2O$, wherein $R_2O$ is selected from the group consisting of 0–15% $Li_2O$, 0–20% $Na_2O$, and 0–10% $K_2O$ and up to a total of 45% of optional ingredients in the indicated proportions selected from the group consisting of 0– 15% MgO, 0–20% CaO, 0–20% SrO, 0–20% BaO, 0–25% MgO+CaO+SrO+BaO, 0– 35% ZnO, 0–10% MnO, 0–2% $CeO_2$, 0–10% $Al_2O_3$, 0–10% $Fe_2O_3$, 0–10% $B_2O_3$, 0–10% $Al_2O_3$+$Fe_2O_3$, +$B_2O_3$, 0–2% $Ln_2O_3$, 0–7% $MoO_3$, 0–7% $WO_3$, 0–7% $MoO_3$+$WO_3$, and 0–8% F, the latter as analyzed in weight percent, wherein the predominate proportion of the copper in the glass exhibits a $Cu^+$ oxidation state.

2. The glass as claimed in claim 1 wherein the glass consists of 32–41% $P_2O_5$, 15–30% $Cu_2O$, 10–25% $R_2O$, wherein $R_2O$ is selected from the group consisting of 5–15% $Li_2O$, 5–15% $Na_2O$, and 0–7% $K_2O$, 0–5% $R_2O_3$, wherein $R_2O_3$, is selected from the group consisting of 0–5% $Al_2O_3$, 0–5% $Fe_2O_3$ and 0–5% $B_2O_3$.

3. A method for making a glass exhibiting a transition temperature below about 300° C., a working temperature below about 400° C. and exhibiting excellent resistance to attack by water and mild aqueous alkaline solutions, the glass composition consisting essentially of the following (in mole percent): 28–42% $P_2O_5$, 15–30% $Cu_2O$, 10–30% $R_2O$, wherein $R_2O$ is selected from the group consisting of 0–15% $Li_2O$, 0–20% $Na_2O$, and 0– 10% $K_2O$ and up to a total of 45% of optional ingredients in the indicated proportions selected from the group consisting of 0–15% MgO, 0–20% CaO, 0–20% SrO, 0–20% BaO, 0–25% MgO+CaO+SrO+BaO, 0–35% ZnO, 0–10% MnO, 0–2% $CeO_2$, 0–10%, $Al_2O_3$, 0–10% $Fe_2O_3$, 0–10% $B_2O_3$, 0–10% $Al_2O_3$+$Fe_2O_3$+$B_2O_3$, 0–2% $Ln_2O_3$, 0–7% $MoO_3$ 0–7%$WO_3$ 0–7% $MoO_3$+$WO_3$, and 0–8% F, the latter as analyzed in weight percent; characterized in that the method is comprised of the following steps;

(a) formulating a glass batch adapted to produce a glass having a composition within the recited ranges, (b) employing at least one batch material of a reducing nature to insure that the copper content of the glass produced is predominantly in the cuprous state, (c) melting the batch at a temperature and for a time to form a homogeneous melt while maintaining melting conditions which will ensure that a predominate proportion of the copper is in the cuprous state, and thereafter, (d) cooling the melt and simultaneously shaping a glass article.

4. The method as claimed in claim 3 wherein the glass consists of 32–41% $P_2O_5$, 15–30% $Cu_2O$, 10–25% $R_2O$, wherein $R_2O$ is selected from the group consisting of 5–15% $Li_2O$, 5–15% $Na_2O$, and 0–7% $K_2O$, 0–5% $R_2O_3$, wherein $R_2O_3$, is selected from the group consisting of 0–5% $Al_2O_3$, 0–5% $Fe_2O_3$ and 0–5% $B_2O_3$.

5. The method as claimed in claim 3, wherein the batch materials employed comprise of: (1) a cuprous copper compound as the batch source, of copper, (2) additional reducing agents as the batch source of $P_2O_5$, and (3) strong reducing agents as the source of optional components.

* * * * *

UNITED STATES PATENT AND TRADEMARK OFFICE
CERTIFICATE OF CORRECTION

PATENT NO. : 5,529,961
DATED : June 25, 1996
INVENTOR(S) : Aitken et al.

It is certified that error appears in the above-indentified patent and that said Letters Patent is hereby corrected as shown below:

Column 1, line 54, "0-15% $CU_2O$" should read --0-15% $Cu_2O$--

Column 1, line 63, "$Al_2O_3+B_2$" should read --$Al_2O_3+B_2O_3$--

Column 2, line 44, "0-10% $B_2$"" should read --0-10% $B_2O_3$--

Column 3, line 17, "0-10% $Fe_2O$" should read --0-10% $Fe_2O_3$--.

Column 3, line 18, "0-10% $Al_2+Fe_2O_3+B_2O_3$" should read --0-10% $Al_2O_3+Fe_2O_3+B_2O_3$--

Column 5, Table I, "$Cu^+/Cu_2O$" should read --$Cu^+/Cu$--

UNITED STATES PATENT AND TRADEMARK OFFICE
CERTIFICATE OF CORRECTION

PATENT NO. : 5,529,961
DATED : June 25, 1996
INVENTOR(S) : Aitken et al.

It is certified that error appears in the above-indentified patent and that said Letters Patent is hereby corrected as shown below:

Column 5, Table IA, "CuO" should read --$Cu_2O$--

Column 6, line 42, "prior an glasses" should read --prior art glasses--

Column 8, Table IV, "CuO" should read --$Cu_2O$--

Signed and Sealed this

Third Day of September, 1996

Attest:

BRUCE LEHMAN

Attesting Officer

Commissioner of Patents and Trademarks